Figure 10:
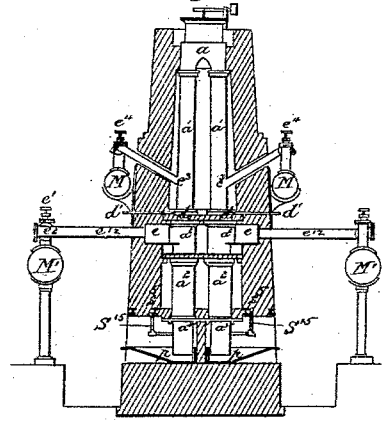

(No Model.) 10 Sheets—Sheet 1.
W. YOUNG & G. T. BEILBY.
PROCESS OF AND APPARATUS FOR OBTAINING AMMONIA FROM COAL.
No. 356,610. Patented Jan. 25, 1887.
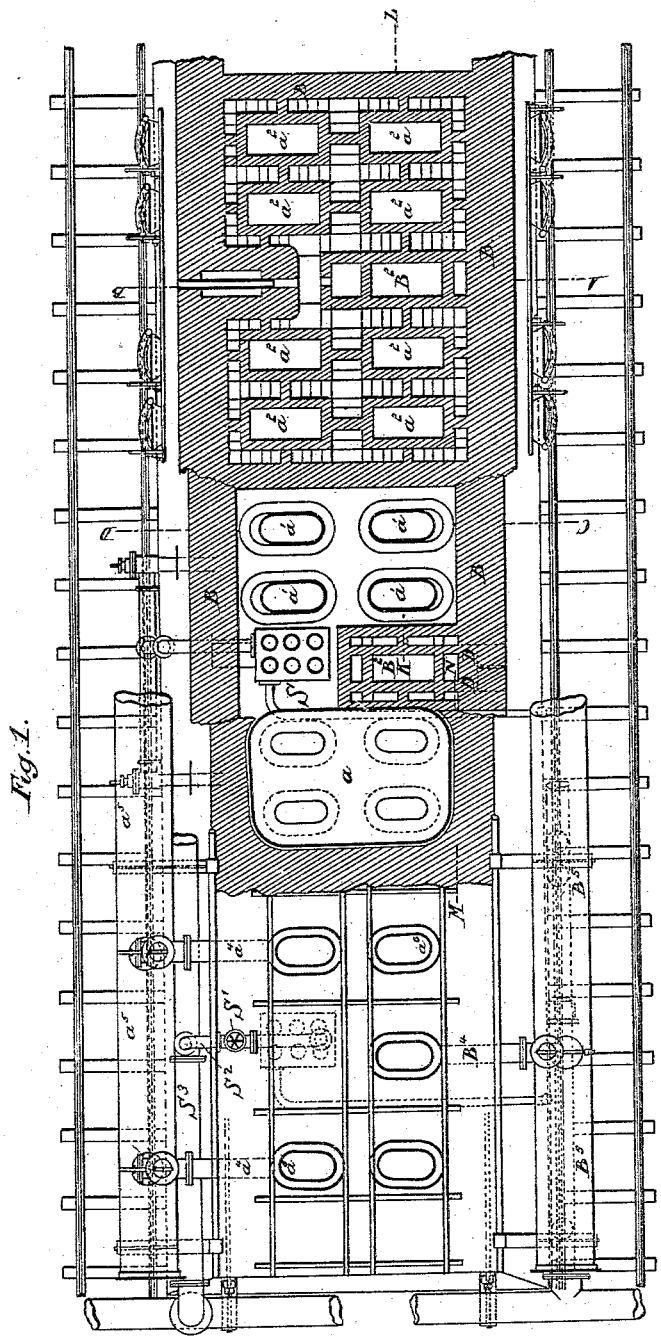

(No Model.) 10 Sheets—Sheet 2.
W. YOUNG & G. T. BEILBY.
PROCESS OF AND APPARATUS FOR OBTAINING AMMONIA FROM COAL.
No. 356,610. Patented Jan. 25, 1887.
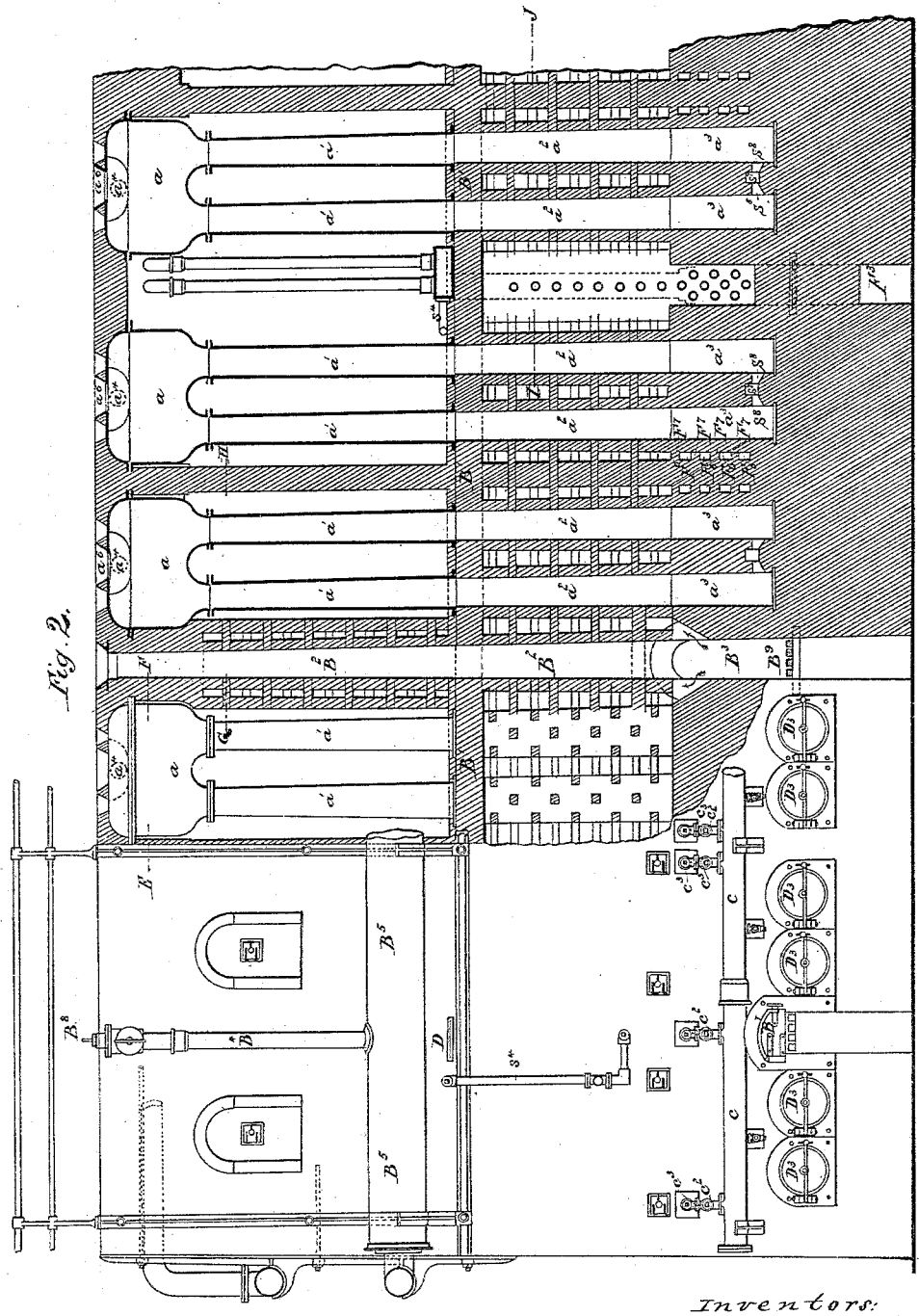

(No Model.) 10 Sheets—Sheet 3.
W. YOUNG & G. T. BEILBY.
PROCESS OF AND APPARATUS FOR OBTAINING AMMONIA FROM COAL.
No. 356,610. Patented Jan. 25, 1887.
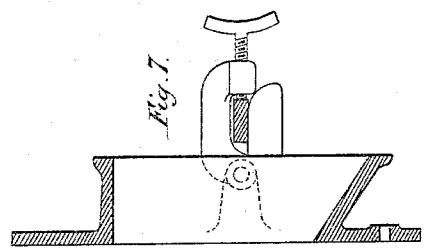
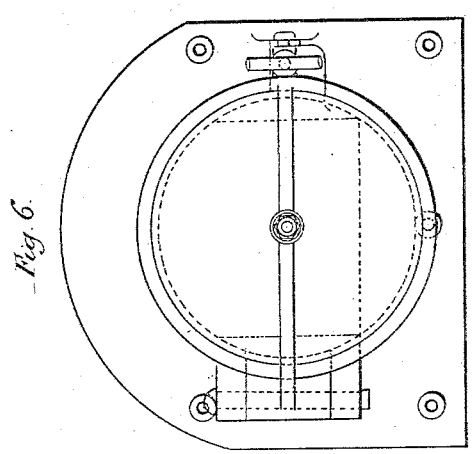
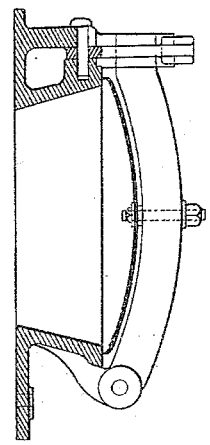
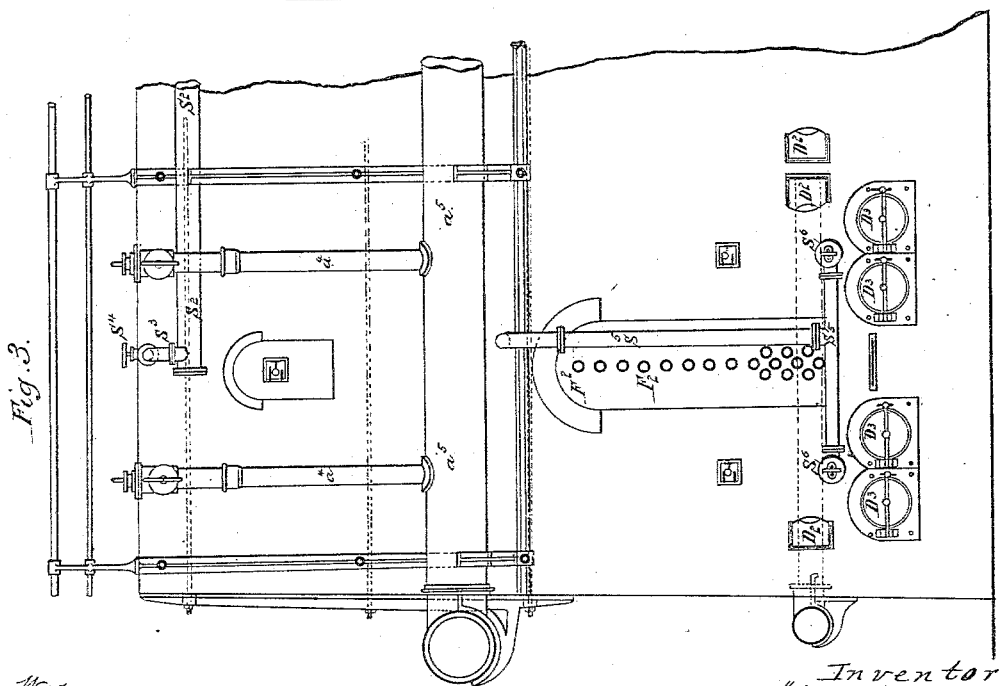

(No Model.) 10 Sheets—Sheet 4.
W. YOUNG & G. T. BEILBY.
PROCESS OF AND APPARATUS FOR OBTAINING AMMONIA FROM COAL.
No. 356,610. Patented Jan. 25, 1887.
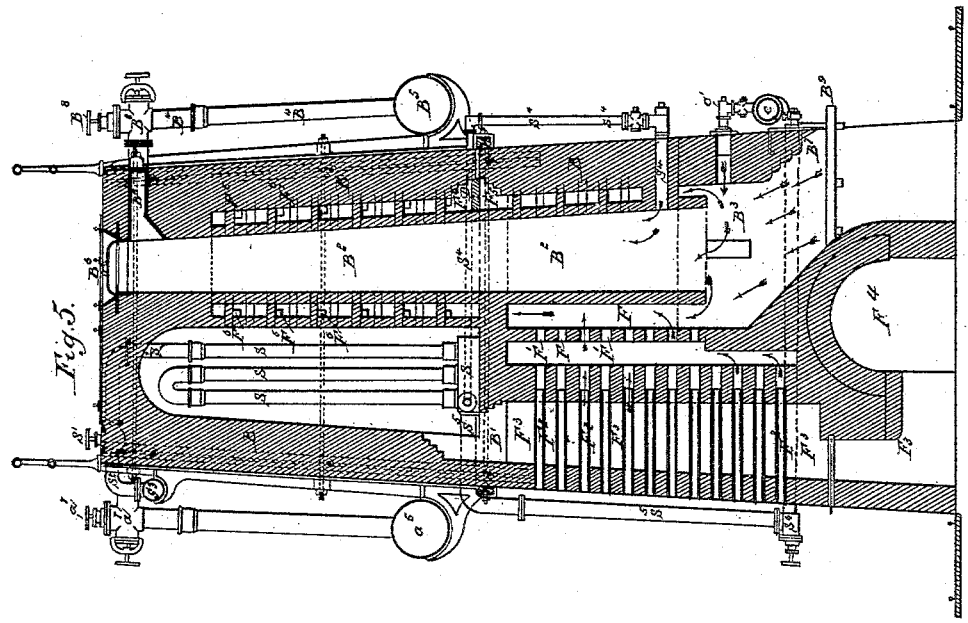
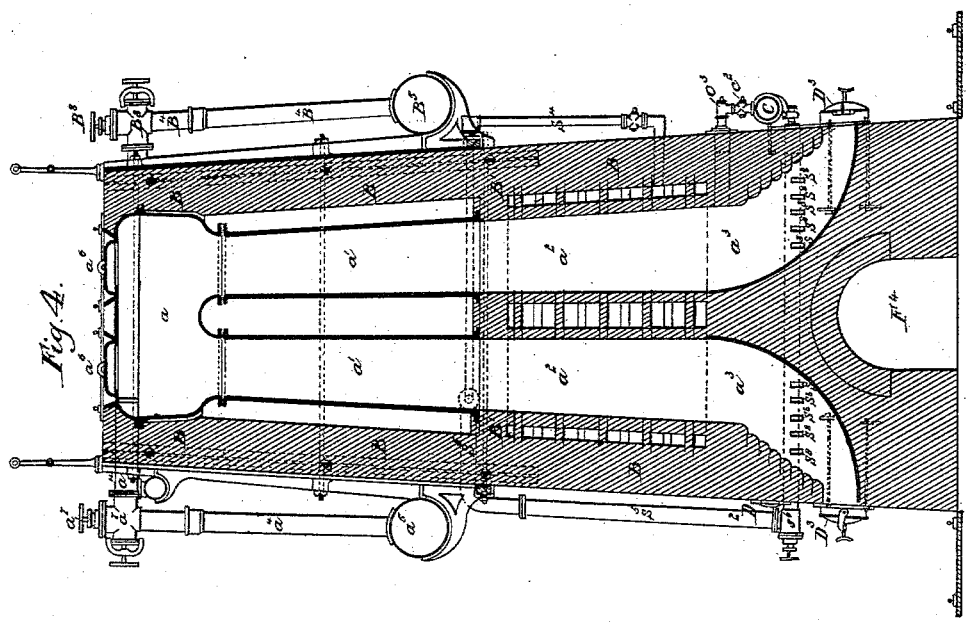
Witnesses:
E. H. Dick
J. Walter Blandford
Inventors:
William Young &
George T. Beilby
by Marcellus Bailey
their Attorney (No Model.) 10 Sheets—Sheet 5.

W. YOUNG & G. T. BEILBY.
PROCESS OF AND APPARATUS FOR OBTAINING AMMONIA FROM COAL.

No. 356,610. Patented Jan. 25, 1887.

Witnesses:
E. A. Dick
J. Walter Blandford

Inventors:
William Young & George T. Beilby
by Marcellus Bailey
their Attorney

N. PETERS, Photo-Lithographer, Washington, D. C.

(No Model.) 10 Sheets—Sheet 6.

W. YOUNG & G. T. BEILBY.
PROCESS OF AND APPARATUS FOR OBTAINING AMMONIA FROM COAL.

No. 356,610. Patented Jan. 25, 1887.

Witnesses:
Inventors:

(No Model.) 10 Sheets—Sheet 7.

W. YOUNG & G. T. BEILBY.
PROCESS OF AND APPARATUS FOR OBTAINING AMMONIA FROM COAL.

No. 356,610. Patented Jan. 25, 1887.

Witnesses:
E. A. Dick
Walter Blandford

Inventors:
William Young & George T. Beilby
by Marcellus Bailey
their attorney (No Model.) 10 Sheets—Sheet 8.
W. YOUNG & G. T. BEILBY.
PROCESS OF AND APPARATUS FOR OBTAINING AMMONIA FROM COAL.
No. 356,610. Patented Jan. 25, 1887.
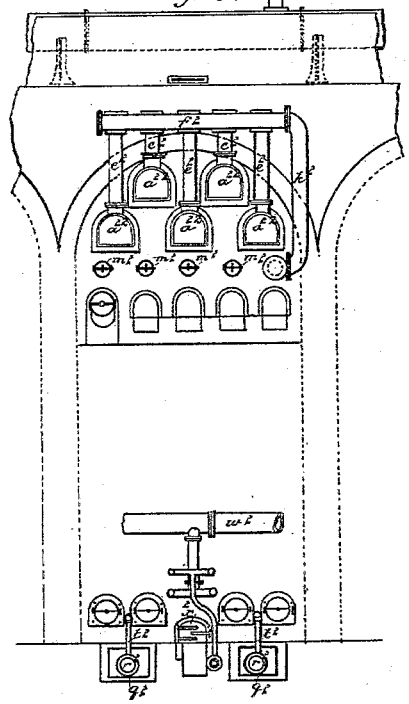
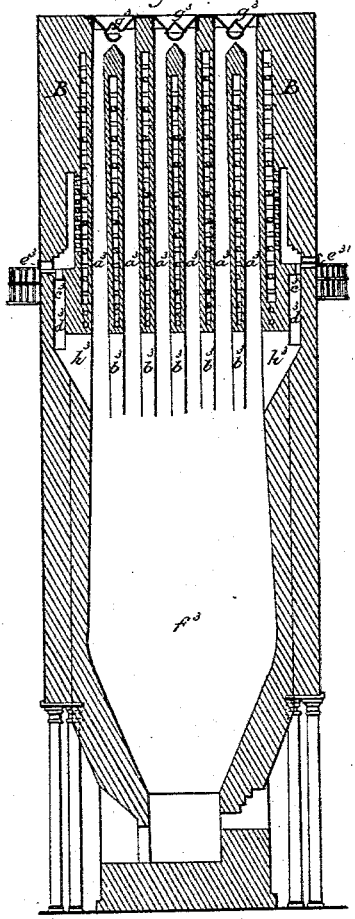
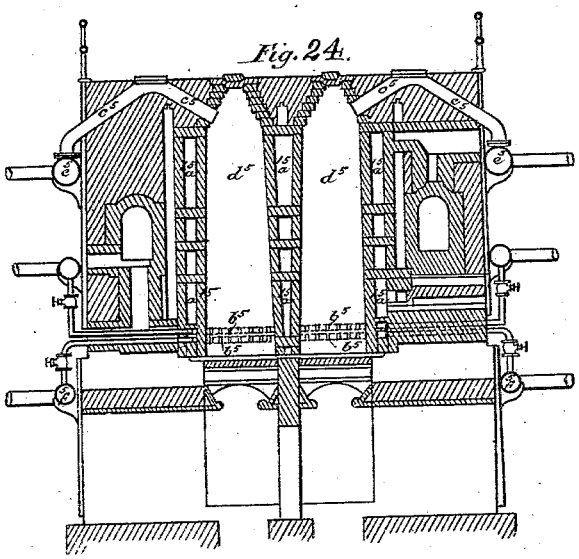
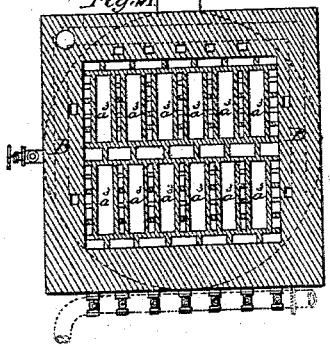

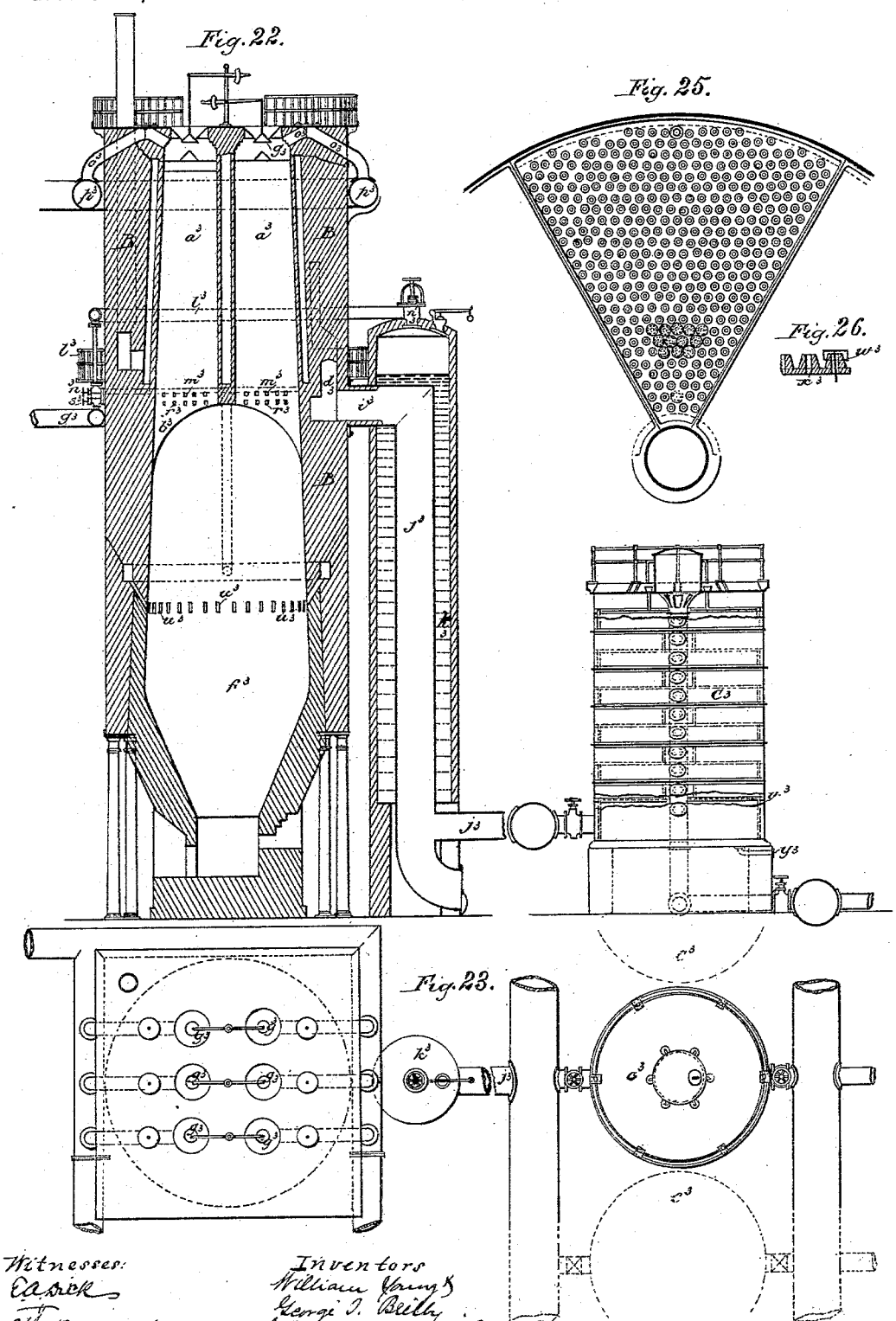

(No Model.) 10 Sheets—Sheet 10.
W. YOUNG & G. T. BEILBY.
PROCESS OF AND APPARATUS FOR OBTAINING AMMONIA FROM COAL.
No. 356,610. Patented Jan. 25, 1887.
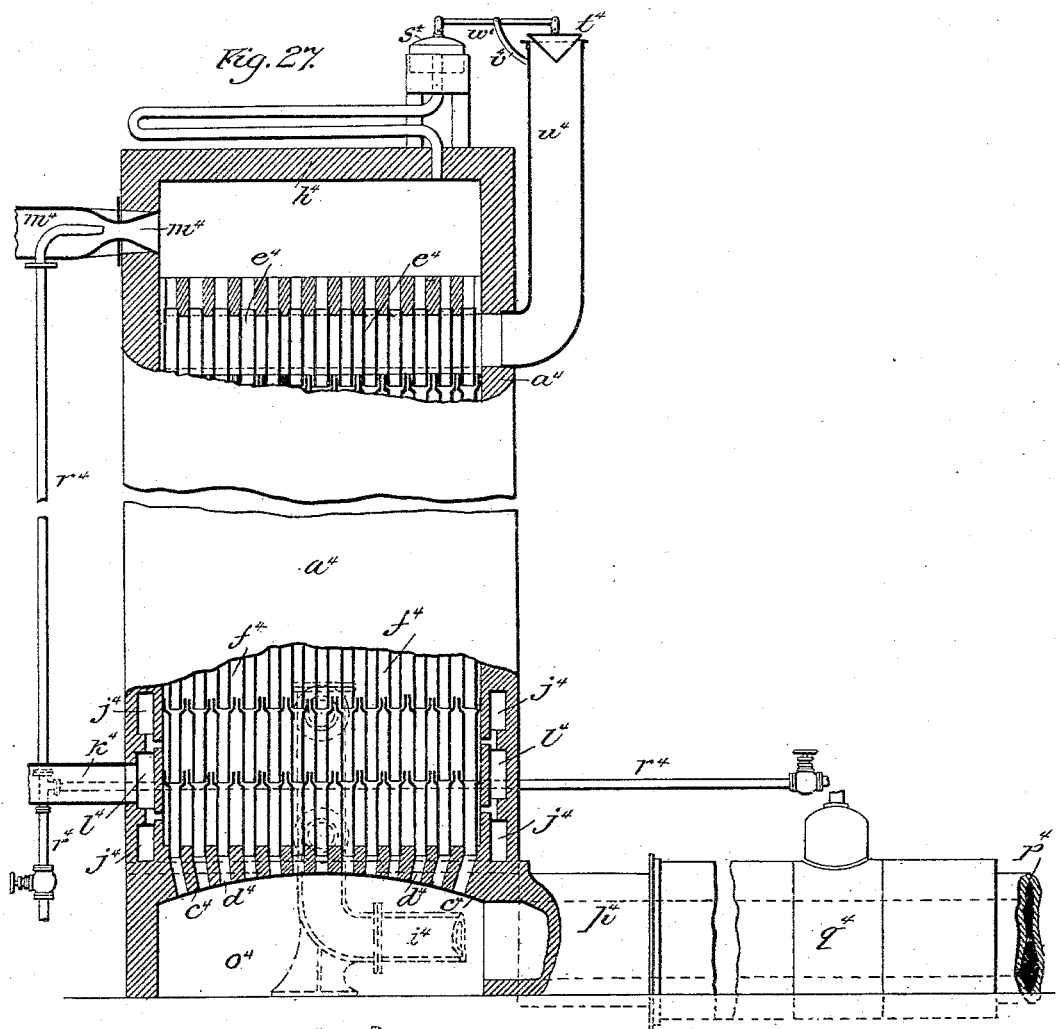
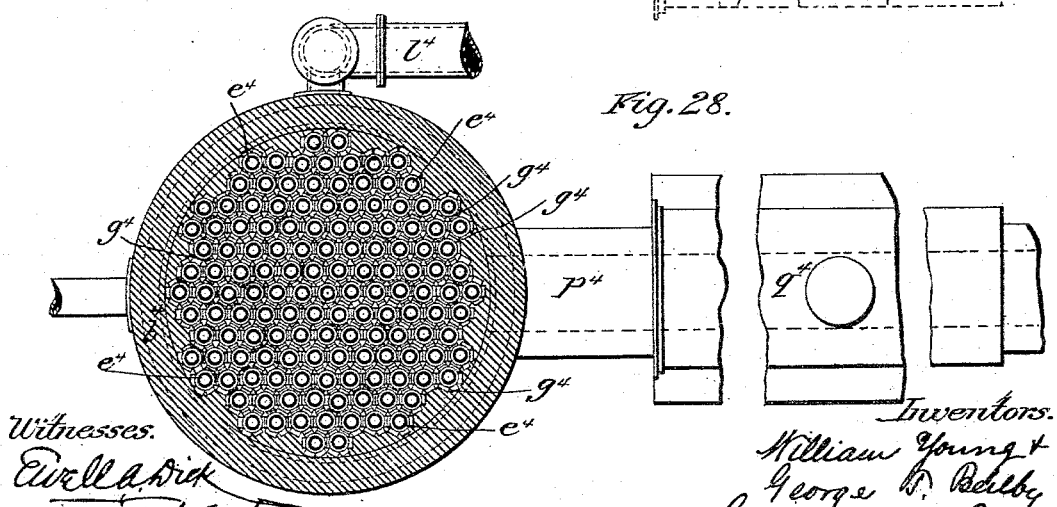

UNITED STATES PATENT OFFICE.

WILLIAM YOUNG, OF PEEBLES, COUNTY OF PEEBLES, AND GEORGE THOMAS BEILBY, OF MIDCALDER, COUNTY OF MID-LOTHIAN, SCOTLAND.

PROCESS OF AND APPARATUS FOR OBTAINING AMMONIA FROM COAL.

SPECIFICATION forming part of Letters Patent No. 356,610, dated January 25, 1887.

Application filed January 23, 1883. Serial No. 82,762. (No model.) Patented in England March 21, 1882, No. 1,377; in France September 21, 1882, No. 151,215, and in Belgium February 7, 1883, No. 60,378.

*To all whom it may concern:*

Be it known that we, WILLIAM YOUNG, of the town and county of Peebles, Scotland, and GEORGE THOMAS BEILBY, of Midcalder, in the county of Mid-Lothian, Scotland, have invented Improvements in the Production and Obtainment of Ammonia or Ammoniacal Compounds from Coal, Shale, Iron-Stone, Limestone, and other Substances, (for which we have received Letters Patent of the United Kingdom of Great Britain and Ireland, No. 1,377, dated March 21, 1882, France, No. 151,215, dated September 21, 1882, and of Belgium, No. 60,378, dated February 7, 1883,) and the following is a specification of the invention.

This invention, which relates to improvements in the production and obtainment of ammonia or ammoniacal compounds from coal, shale, iron-stone, limestone, and other substances, has especial reference to the production thereof in conjunction with the productions of oil, tar, or gases, and other products, such as calcined lime or roasted iron ore.

It also consists of certain new or improved arrangements of apparatus whereby the said improvements are carried into practice.

When coal is used in its raw state for fuel in blast-furnaces, the volatile matters are distilled out and with open-top furnaces are lost, and when close-top furnaces are used the tars form a source of trouble by closing up the tubes and passages, and when the ammonia is extracted from those gases the tars interfere greatly with the operation by clogging or closing up the interstices in the material or vessel in which the ammonia is absorbed. The same annoyance—namely, the closing up of the tubes or passages—is experienced in gas-generator furnaces when bituminous coal is converted into combustible gases to be used as fuel, and in the calcining of iron-stone and limestone or other minerals. When coal is used, the volatile matters, together with those from the minerals, are at present lost, and are a source of nuisance to the district in which such operations are conducted.

By our invention we subject the coal and other materials to a preliminary heating and destructive distillation in such a manner that during the process of distillation air is excluded and the volatile constituents recovered—as tar, oil, gas, and ammoniacal liquors. This preliminary destructive distillation we effect by placing a retort or retorts over or in the blast-furnace, gas-generator furnace, or calcining-kiln. Such retorts may be constructed of fire-brick or iron or of other fire-resisting material, and closed at the top by means of a hopper and valve or other suitable door, the lower end of the retort being open and communicating with the blast-furnace, generator, or calcining-furnace.

The retort or retorts are surrounded with brick-work having a flue-space for the application of heat to the external surface of the retorts. The retorts are provided with a pipe for conveying the distilled volatile matters to suitable condensers, where the condensible matters are removed in the form of tar, oil, and ammoniacal liquor, the gas, or a part of it, being returned back into the bottom of the retort to prevent the ingress of air. A pipe for the introduction of steam is also fitted to each retort above the gas-inlet pipe. This steam passes through the hot material in the retort and effects the elimination of the ammonia in the manner hereinafter described. The retorts may also be provided with a valve or equivalent arrangement to regulate the quantity of volatile vapors drawn off from the distilled bituminous coal or other mineral. The heat necessary for effecting this preliminary destructive distillation is obtained by the combustion of the fixed carbon of the coal as it finds its way from the distilling-retorts into the blast-furnace, gas-generator, or calcining-kiln, and where this fixed carbon is in large excess, as in blast-furnaces, the resulting carbonic oxide is carried off from the top of the oven, in which the retorts are placed, and may be used as fuel, either separately or mingled with the combustible hydrocarbon gas from the destructive distillation of the coal or other bituminious matter effected in the retorts. When the carbon is not in excess and carbonic acid is formed, the products of combustion pass off to a chimney or into the air; or where heat from the slow conversion of the coal into combustible gases is not sufficient, part of the combustible gases themselves may be used to effect the preliminary distillation in the retort over the distillation-chamber.

The coal and other mineral is fed into the top of the retorts, through which it gradually drops into the blast-furnace, generator, or calcining-kiln either as it is consumed, melted, or withdrawn. The volatile matters are distilled out in the retorts, air being excluded by the gas, and the residuum or coke is subjected to an atmosphere of steam in order to eliminate the nitrogen contained as ammonia, and is thereafter consumed in the production of carbonic-oxide gas and used in fluxing the iron and calcining the lime, iron-stone, or other material.

When the coal is not subjected to this preliminary distillation, but the volatile tars accompany the gaseous products, they may be removed by a process of washing with water kept heated to a temperature which will prevent the absorption of volatile ammoniacal compounds, and the washed gases subjected to the action of a non-volatile acid—such as sulphuric acid—to form salts of ammonia; or the gases containing the tars may be subjected to a high temperature in the presence of steam, whereby they will be decomposed and any nitrogen they contain eliminated as ammonia.

The second part of this invention has for its object the obtaining from coal, shale, or other bituminous minerals, when used for the production of illuminating and heating gases, of a largely-increased yield of ammonia, and this is effected by subjecting the coke or residue of the coal and other substances after it has parted with all or most of its hydrocarbon gases to the action of sufficient heat and of steam, thereby obtaining a quantity of ammonia which has hitherto been wasted, together with poor gases suitable for heating purposes. This may be effected in the ordinary horizontal gas-retort by providing each retort with arrangements for passing a current of steam through the hot coke or residue after it has parted with all or most of its hydrocarbon gases. Two separate sets of exit-pipes, valves, and mains are provided—one set for the removal of the illuminating-gas in the usual manner to the condensers and purifiers, the other set for the removal of the "poor gases," steam and ammonia obtained by the action of the steam upon the coke or residue, the latter gases and vapors being treated for the recovery of ammonia by condensation and water-washing or by being passed while hot through a suitable acid scrubber, or in any other convenient manner. The following are two methods by which this may be effected:

First. The oil vapors from the exit-pipe, instead of passing directly to the mains and condensers, may be led through a secondary retort or tube, which is kept at a sufficiently-high heat to convert them into permanent gas of great richness, which may be reduced to a suitable illuminating power by the mixture with it of the whole or a part of the poorer gases produced in the lower retort, the mixed gases being led through mains, condensers, and purifiers as usual, means being provided for removing any excess of these poor gases before they pass through the gas-making retort and recovering the ammonia from these gases, as before described.

Second. By placing the exit-pipe for the illuminating-gas lower down on the retort and in the oven. If, then, the temperature of the upper oven be raised to the point most suitable for making illuminating-gas, tar vapors and ammonia will come off by this exit-pipe, the gases from the upper and lower retorts being treated substantially as described in the first case.

In carrying out this part of the invention by means of the ordinary horizontal retorts the retorts are heated and charged as usual. When all of the rich illuminating-gas has come off, the steam is turned on and the valves on the exit-pipes are turned so as to send the poor gases through the second set of mains. The steaming is carried on as long as the gases contain sufficient ammonia to repay the cost of its recovery therefrom.

In carrying out this part of the invention by means of the double vertical retort the coal, shale, or other mineral is passed through the retorts in a practically-continuous stream, just as is the case when the retort is used for oil-making, the heat of the upper gas-making retort being regulated so as to produce the maximum yield of rich gas, the quantity of gas passing up from the lower retort and through the upper being regulated by the pressure at the two exit-pipes.

When crude paraffine-oils are ordinarily obtained from shale, they contain considerable quantities of carbonaceous matters, which it has been found desirable to remove before subjecting the oils to chemical treatment with acid and alkali, and this has been hitherto accomplished by subjecting the oils to distillation in the ordinary well-known manner. Now, as the temperature at which the elements of the shale are decomposed into oil vapors is considerably higher than that necessary for the simple volatilization of the oils, the oil vapors, together with the watery vapor, leave the ordinary retorts or distilling-vessels at a temperature sufficiently high to volatilize a considerable quantity of oil. This state of matters holds still further when the retorts or distilling-vessels are employed to carry out the process of distillation at two temperatures—one a low-red heat, for the production of oil, and the other a bright-red heat, for the elimination of the ammonia by the action of steam at high temperatures. At present this surplus heat is not only lost, but it entails the cost of large air or other refrigerating power to dissipate and allow the oil to condense.

The third part of our invention, then, has for its object the utilization of this surplus temperature to effect the preliminary distillation of the oils, fitting them for direct chemical treatment with acid and alkali, and we accomplish this object by placing on the top of the oil-distilling retorts a chamber which acts alternately as a condenser or precipitator and as a still for the redistillation of the condensed oils. This condenser may be attached to each separate retort; but we prefer one large chamber to two or more retorts, as it is more economical, requiring less metal in its construction and enabling fewer charge-doors to be employed. The chamber should be of a capacity equal at least to that of the oil-distilling retorts to which it is attached.

When two or more retorts have one common chamber, it is preferred that the outlet from the chamber be so arranged that the oils must pass over the colder shale before leaving the condenser, the outlet for the oil vapors being as close as possible to the top of the chamber. To explain the action of this chamber, let it be supposed that both the high-heated and the low-heated retorts are filled, the shale-coke having just been dropped from the low-heated retort into the high-heated one, and the low-heated retort having received its charge from the chamber above, into which a fresh charge of shale has just been introduced. The superheated steam, gases, and ammonia pass from the high-heated retort up through the shale in the low-heated retort, assisting in the destructive distillation and the elimination of the oil in the form of vapor. The whole of the combined oil, water vapor, gas, and ammonia pass up and through the cold shale in the chamber above, causing the condensation of the oil vapors, and at the same time heating the shale. This condensation continues so long as the temperature of the shale remains sufficiently low, and the shale being covered with oil vapors entangles the mechanical impurities which would be carried forward with the oil. As the temperature of the shale in the chamber gradually increases by the continuous flow of the heated gases and vapors through it, the more volatile of the previously-condensed oils revolatilize, and as the temperature goes on increasing the less and less volatile of those oils are evaporated until by the time the distillation of the shale in the low-heated retort is completed the last traces of the previously-condensed oil are revolatilized and the shale heated to a temperature approaching the point of decomposition. The transference of the contents of the different departments of the distilling apparatus is now effected, the whole residue being drawn off from the bottom thereof, a fresh charge of shale being then placed in the chamber and the conditions hereinbefore described repeated.

In cases where it is not advantageous to utilize the highly-heated steam for the distillation as well as the redistillation of the oil we employ two entirely separate retorts, one placed above the other and so arranged that the residue from the upper retort may be discharged into the lower retort. In this case we use separate exit-pipes for the volatile products from the two retorts, those products from the oil-distilling retorts being led to the ordinary mains and condensers, while those from the more highly-heated retorts may be led to separate condensers or scrubbers. Air may be introduced for mixture with the steam in carefully-regulated quantity into the bottom of the more highly-heated retorts to assist in the removal of the fixed carbon of the residue as carbonic oxide.

Figure 11:
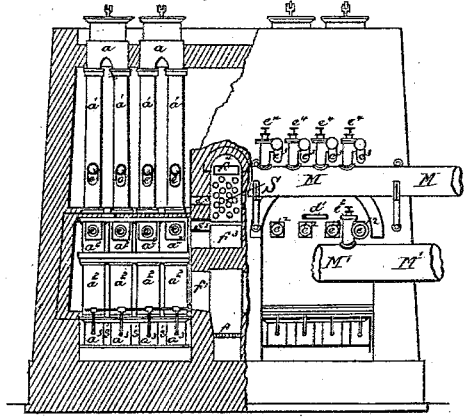
Figure 9:
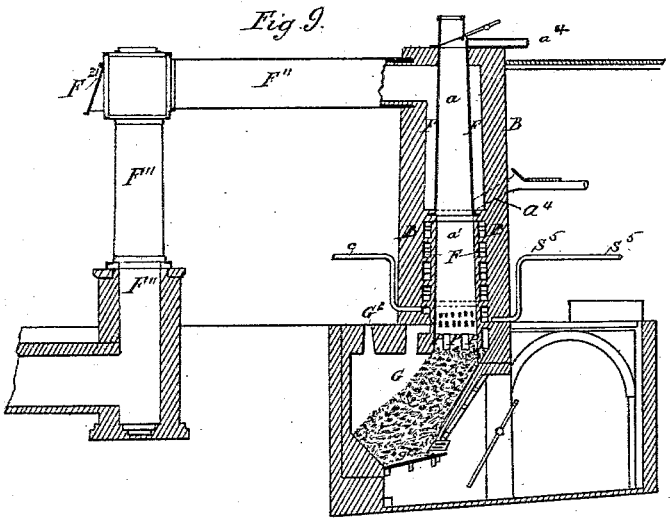
Figure 12:
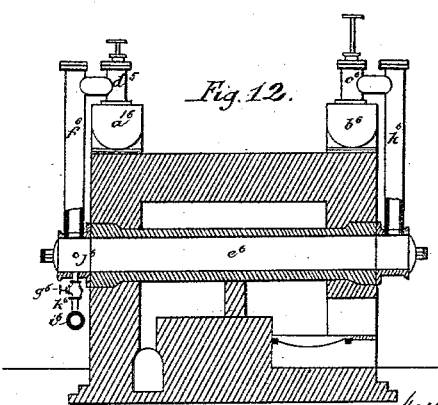
Figure 13:
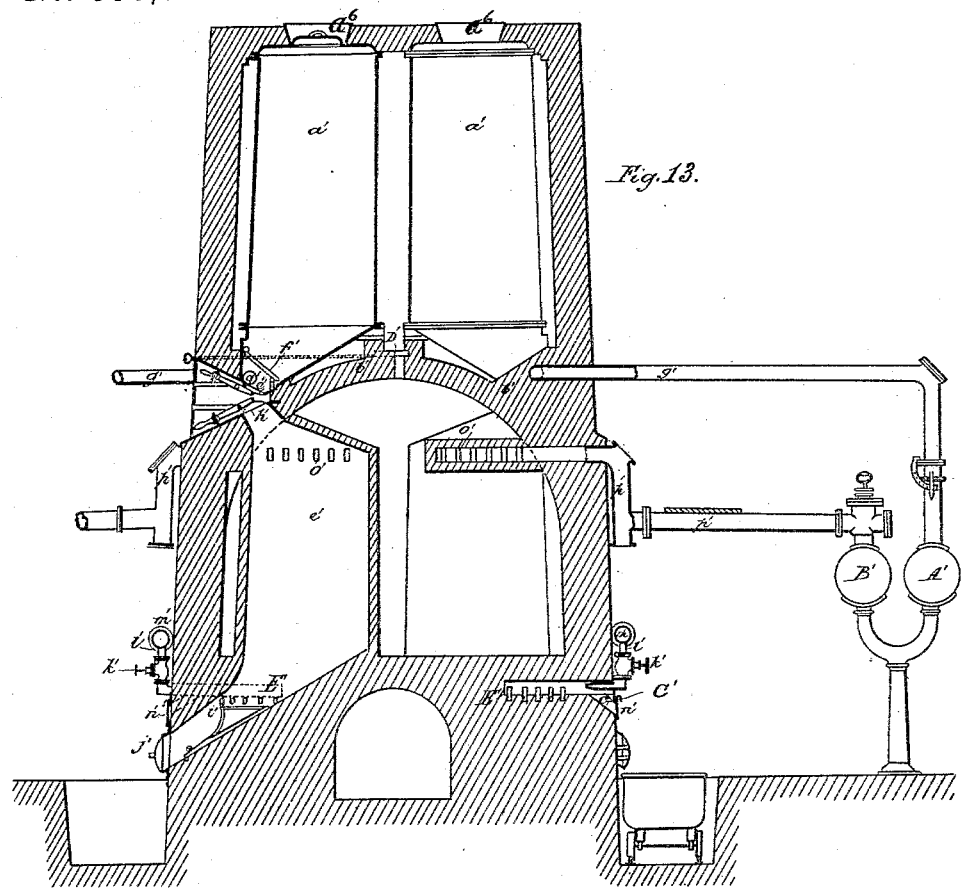
Figure 14:
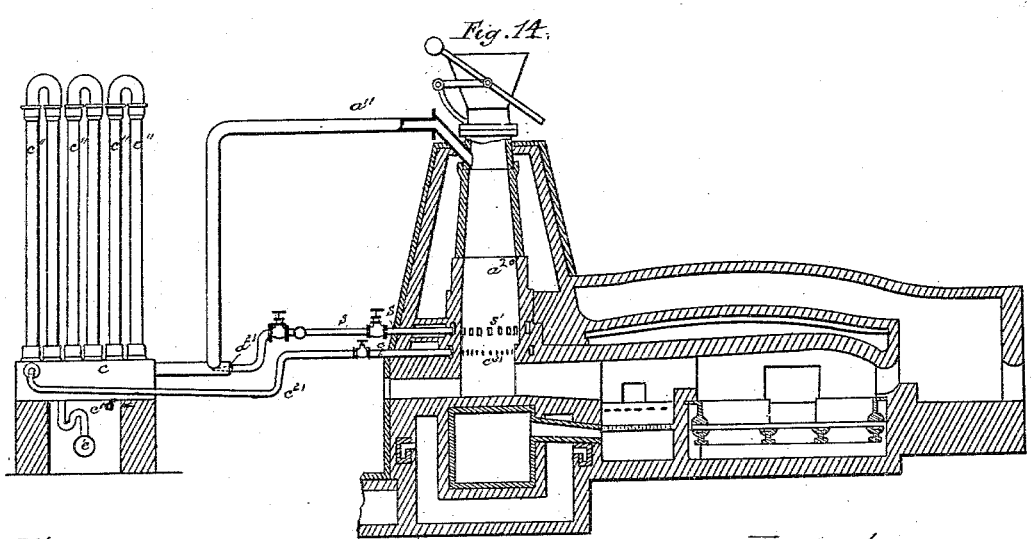
Figure 15:
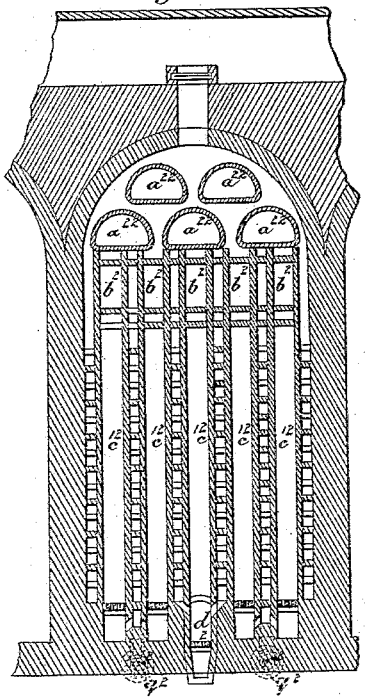

In the drawings, Figures 1, 2, 3, 4, and 5 are, respectively, a plan, partly in section, a front elevation, also partly in section, a back elevation, and transverse sections on the lines A B and C D, Fig. 1, E F, G H, and I J, Fig. 2, and K L, Fig. 1, of one form of apparatus for carrying out our invention for obtaining ammonia and ammoniacal compounds and for effecting the further objects of this invention. Figs. 6, 7, and 8, respectively, are enlarged elevation and sections of discharge-door on the lower openings of the retorts for shale-distillation. Fig. 9 shows the application of our invention to a Siemens gas-generator. Figs. 10 and 11 show the application of the invention to an apparatus for the manufacture of carbonate of soda. Fig. 12 is a sectional view of a retort used in carrying out our invention. Fig. 13 is a sectional view of another modification. Fig. 14 shows the application of our invention to what is known as "Price's retort-furnace." Figs. 15 to 19 show another modification of our invention. Figs. 20 to 23 show a blast-furnace embodying our invention. Fig. 24 shows a coke-oven embodying our invention. Figs. 25 and 26 are detail views. Figs. 27 and 28 show a decomposing apparatus used in carrying out our invention.

Similar letters refer to similar parts on all these figures.

The different sections of the retorts for the distillation of the shale or other bituminous mineral and for the redistillation of the resulting oil are marked $a\ a'\ a^2\ a^3$. The parts $a\ a'$, being subjected to a dull-red heat, are preferably made of cast-iron, and the remaining portions, $a^2\ a^3$, having to resist a very high temperature, of fire-clay. Eight of these retorts are shown as being placed in one oven, surrounded by the brick walls B, this oven being divided into two parts by the horizontal partition-wall B', and having a central retort, $B^2$, built of fire-brick, for the treatment of the coal used as fuel, and provided at its lower end with a furnace or chamber, $B^3$, for the conversion of the coke into gas to effect by its combustion the distillation of both the coal and the shale.

The redistillation-chamber $a$ is shown as common to four retorts, and is provided with an outlet-pipe, $a^4$, leading to a main, $a^5$, supported on cast-iron or other brackets. Each coal-retort $B^2$ is similarly provided with an outlet, $B^4$, leading to the main $B^5$, similarly supported on brackets. These mains are connected to any convenient form of condenser and washing or scrubbing apparatus for the recovery of the oil, tar, or ammonia. In working these retorts the portions of the shale-retorts marked $a^3$ $a^2$ are filled with shale, coke, coal, ashes, slag, or other substance of a similar nature, the object being to give support to the shale when first charged into the portion of the retort marked $a'$ and the redistillation-chamber $a$. A fire of coal or other fuel is then kindled in the combustion-chamber $B^3$, the fuel being fed either from the hopper and door above the retort $B^6$ or through the door $B^7$. (See Fig. 5.) So soon as the fire-clay portions of the shale-retorts $a^2$ and the coal-retorts $B^2$ are brought to a bright-red heat by the passage of the fire-gases around them, and the upper portions of the shale-retorts $a'$ are of a very dull-red heat, (the relative temperatures being obtained by regulating the dampers D,) the coal-retort is charged full of the coal, which coming, as it does, into contact with the red-hot walls of the retort at once gives out its volatile matter. An exhaust is then produced in the main $B^5$ by any of the well-known types of exhausters, and the valve $B^8$ on the connecting-outlet $B^4$ opened, so that all the distilled matter is caused to flow onto the condensers, where the tar and the ammoniacal liquor are condensed and separated; but in order to insure that all the volatile matter of the coal shall pass to the condenser, it is necessary to have an exhaust always in excess of that necessary to draw off the products of distillation, and if means were not taken to prevent it the fire-gases from the furnace or combustion-chamber would be drawn up into the retort $B^2$ and through or among the coal undergoing distillation. To prevent this the non-condensable portion of the products of distillation or the gas is returned back under the bottom of the retort by the main pipe $c$ and the branch pipe $c'$, Fig. 5. Part of this gas is drawn up into the retort instead of the fire-gases, and the other portion of the gas, equivalent to the quantity being made or produced by the coal undergoing distillation, passes through or among the coke and commingles with the carbonic-oxide gas produced by the oxidation of the carbon from the coke of the coal by the air passing through the grate-bars $B^9$. The mixed combustible gases pass, as shown by the arrows, through the flues F, Fig. 5, and the ports F', where they are met by a current of air which has been heated by passing through the pipes $F^2$, placed in the flue $F^3$, carrying off waste products of combustion to the main flue $F^4$, placed under the retorts. The combustion of the gases by this heated air keeps up a steady and regular high temperature around the whole of the lower part, $a^2$, of the shale-retort and $B^2$ of the coal-retort, Figs. 4 and 5, and thence passes up by the flue $F^5$, containing the regulating-damper D, first around the upper portion of the coal-retort $B^2$, and then through the ports $F^6$ into the upper oven, containing the iron portion of the shale-retorts and arrangement of pipes S for superheating the steam. So soon as the coal in the lower portion of the coal-retort has parted with its volatile matters, steam is let into the superheating arrangement S by opening the valve S' on the pipe $S^2$, leading from the main steam-pipe $S^3$. From the superheating arrangement the steam is led into the lower part of the coal-retort $B^2$ by the pipe $S^4$. This steam, partly undergoing decomposition, supplies the hydrogen necessary to combine with the fixed nitrogen in the coke of the coal undergoing distillation and eliminates it as ammonia, which passes off, together with the undecomposed steam and the tars from the distillation of the coal in the upper retort to the condenser, and are there separated. As the coke from the coal burns away in the atmosphere of steam in the lower portion of the retort $B^2$ and in the atmosphere of air in the converting-chamber $B^3$, fresh coal is added from above by means of the hopper and door $B^6$, and thus the process goes on continuously, the coal undergoing destructive distillation in the upper part of the retort and the coke treated to an atmosphere of steam in the lower portion of the retort, the residual coke being burned into carbonic oxide, which commingles with the hydrocarbon gases from the condensers and passes up, being consumed in heating the retorts.

A fourth supply of heat may be obtained by using the gas from the main gas-pipe $c$, into which may be led the combustible gases from the distillation of the shale by opening the stop-cocks $c^2$ on the pipe $c^3$, Fig. 2, leading to the flue $F^6$, having ports $F^7$ leading to the oven. A supply of air for the combustion of this gas may be obtained through the flue $F^6$, last mentioned, and the quantity of air so admitted may be regulated by the sliding damper $D^2$, Figs. 2 and 3.

The shale or other bituminous mineral is charged into the retorts by the hoppers and doors $a^6$ on the top of the redistillation-chamber $a$ until the retort $a'$ and chamber $a$ are full, and the door being replaced and luted, and the valve $a^7$ on outlet-pipe $a^4$, leading to the main $a^5$, opened, (see Fig. 4,) the low-red heat distillation of the shale or other bituminous substance at once begins in the retorts $a'$; but as the products of distillation from the shale in this part of the retorts have to pass up through and among the cold shale in the redistillation-chamber $a$, the greater part of the less volatile portions are condensed on the surface of the shale. A small quantity of steam is now let into the bottom section of the retorts $a^3$ by opening the valve $S^6$ on the pipe $S^5$, leading from the superheater S in the upper portion of the oven into the passage $S^7$, between the four retorts which it has to supply, and, escaping through the port-holes $S^8$, the steam passes up through the red-hot shale, coke, ashes, or similar substance in the section of retorts $a^2$, becomes highly heated, and assists the distillation of the shale in the low-heat section of the retort. As the shale in the redistillation-chamber becomes heated by the constant passage of the products of distillation, the most volatile of the previously-condensed oils are revolatilized and the heavier or less volatile precipitated until by the time the charge of the shale in the retort is exhausted the shale in the redistillation-chamber is sufficiently heated to allow of the whole previously-condensed oil being revolatilized. The doors $D^3$ on the lower openings of the retorts are now opened and as much ash is then drawn from the lower section of the retorts or cooling-chambers $a^3$ as will admit of the coke of the shale in the section $a'$ to fall into the section $a^2$ and the warmed shale in the redistillation-chamber $a$ to fall into the section $a'$.

The doors $D^3$ on the lower opening are then closed, and the redistillation-chamber $a$ again charged full of shale. More steam is now also admitted, this steam being highly heated by passing through the hot shale, coke, or ashes, which has just been dropped from the section $a^2$ into the section $a^3$, and in passing up through the coke of the shale in the section $a^2$ partially undergoes decomposition and supplies the hydrogen to combine with the fixed nitrogen in the coke, which it eliminates as ammonia.

The undecomposed steam, ammoniacal vapor, and water-gas pass up through the shale, undergoing distillation in the section $a'$ of the retort, the oil being at first condensed on the surface of the shale in the redistillation-chamber $a$, to be afterward redistilled by the heated steam and products of distillation heating up the cold shale to the necessary temperature. So soon as the second charge of shale in the section $a'$ of the retorts is exhausted of its bituminous matter, the lower door, $D^3$, is again opened, and the shale, coke, or ashes in the cooling-chamber, or the lower section, $a^3$, of the retorts, is discharged to allow the exhausted coke from the shale in the section $a^2$, as well as that in section $a'$, together with the shale in the redistillation-chamber $a$, to fall a stage. A fresh supply of shale is then charged into the redistillation-chamber $a$, and the previously-described series of processes is then repeated.

The whole of the retorts may be drawn at once or discharged in sequence, as may be found most convenient.

When bituminous iron-stone is treated in this arrangement to recover the oil, tars, and ammonia, the residue drawn from the retorts should be tipped into a heap of such a depth as will insure a certain amount of vitrifaction to make it sufficiently strong to stand the crushing weight of the burden of the blast-furnace.

Fig. 9, Sheet 5, shows the application of our invention to a Siemens gas generator or producer. The retorts $a$ are placed in the uptake-flue F from the converter or gas-generator G, and are surrounded with thick walls B to conserve the heat. $a$ is the retort, which may be built altogether of brick or, as shown, partly of iron. One or more of these retorts may be placed over one gas generator or producer, preference being given to a retort flat or oval in cross-sections, as a thinner stratum of coal distills much more quickly than one of greater thickness.

The gas generator or producer is started into operation by kindling a fire within the chamber G at first, and until the whole interior of the apparatus is brought to a bright-red heat the combustion of the volatile matter of the fuel on the grate $g^{12}$ is allowed to be completed in the gas generator or producer, air being admitted for this purpose by the opening $G^2$ in the roof, the products of combustion being allowed to escape into the air through the valves $F^2$ upon the off-take pipe $F'$. So soon as the whole retorts $a$ $a'$ and generator or producer G are brought to the proper temperature by, which time the generator G and part of the retort $a'$ should be filled with coke, the retort $a$ is filled with coal, when the destructive distillation of the coal inside the retort commences.

The products may be drawn off from the retort by the pipe $a^4$ either at the top or, as shown in dotted lines, a considerable way down the retort. When taken from the top the pipes are not so liable to choke up with sooty matters; but an inferior tar is produced, containing less benzole, and the useful distilling effect of the hot steam is lost.

To insure that the whole products of distillation may be drawn off by the outlet-pipe $a^4$, and that the combustion-gases from the generator do not enter the retort, the same method is pursued, as already described, where the invention is applied to the retorts for distilling the coal used to heat the shale-retorts, the return gases entering by the pipe $c$, and the steam for effecting the elimination of the ammonia by the pipe $S^5$. The arrangement being now fairly started into operation, the opening $G^2$ is closed, as also the valves $F^{21}$ on the gas-pipe $F^{11}$, the distillation of the coal being carried on by the hot carbonic oxide produced from the coke, resulting from the distillation of the coal passing up and around the retort or retorts $a$ $a'$ by the ports P and flue F. This carbonic oxide, together with the hydrocarbon gas and water-gas passing from the bottom of the retorts, makes an excellent heating-gas.

In order that sufficient heat may be produced from the conversion of the carbon of the coke into carbonic oxide to effect the distillation of the coal, the working of the generator must be pushed faster than is usual; but this may be safely done, as the depth of the layer of coke upon the grate-surface insures the conversion of the whole of the oxygen of the admitted air into carbonic oxide. Where it is necessary, however, to retard the process of the conversion of the coke into gas, the retort may be so arranged as to be heated by the combustion of a part of the gas resulting from the distillation of the coal in the retort or a part of the carbonic-oxide gas from the converter.

Fig. 14 shows a somewhat similar application of the invention to what is known as "Price's retort-furnace." In this modification the heat necessary to effect the destructive distillation of the coal and the elimination of the nitrogen or a part of it as ammonia is supplied by the waste heat passing from the reverberating furnace to the chimney.

Instead of allowing the distilled volatile matters from the coal to pass direct from the bottom of the furnace $a^{20}$, as has hitherto been the case, they are drawn off by the pipe $a^{11}$, the necessary exhaust being caused by the steam-jet $a^{21}$, and passed to the condenser $c^{11}$, where the condensable tars, undecomposed steam, and ammonia are separated and drawn off by the pipe $c^{10}$, the non-condensable gas being returned by the pipe $c^{21}$ back into the lower end of the retort $a^{20}$, where it is allowed to escape through the ports $c^{31}$, passing thence partly up through and among the coal and partly to the combustion chamber or furnace.

To eliminate the nitrogen from the shale-coke, steam is admitted by the pipe S through the ports S' around the lower end of the retort. This steam acts in the manner already described.

Fig. 13 is a sectional view of another modification for carrying out our invention in such a manner that the products of the destructive distillation of the shale or other bituminous substance are kept separate from the steam, water, gas, and ammoniacal products.

Any convenient number of these retorts can be set in one oven, the heat necessary to effect the distillation of the shale and the elimination of the ammonia being obtained from coal or other fuel in an ordinary furnace or by having a retort arrangement for distilling the coal and recovering the tar and ammonia in the manner described, and as shown in Figs. 1 to 5; or part of the heat may be obtained by admitting a quantity of air together with the steam entering the retort for the elimination of the ammonia from the coke. The oxygen of the air, combining with a portion of the carbon of the coke, heats the steam, while also assisting in the supply of heat to enable the steam to act upon the remaining portion of the coke and eliminating its nitrogen as ammonia. Where this arrangement is employed to distill shale or other bituminous substances for the production of paraffine-oil, the upper retorts, $a'$, are preferably made of iron and separated by the partition-wall $b'$, having regulating-dampers D' from the lower retorts, $e'$, which, having to stand a high temperature, are preferably made of fire-clay; but where coal or other bituminous substance has to be distilled for the production of gas, or with the object of producing tars containing benzole and its homologues, both retorts are preferably made of fire-clay, and the partition-wall $b'$ and regulating-damper D' are not necessary, as the difference in the temperature to which the two retorts are subjected does not require to be so great.

The arrangement is worked by getting up the desired temperature upon the retorts, then charging the shale, coal, or other bituminous mineral by the hoppers and doors $a^6$, the lower door, $e^{11}$, and grating $f'$ having been previously closed and fixed in their position. The products of the destructive distillation may be drawn off from any convenient part of the retorts, but is shown as from the bottom by the pipe $g'$, leading to the main A'. From this main A' the products are led to the condenser, and there treated in the usual well-known manner.

So soon as the destructive distillation of the bituminous matter in the upper retort is completed the cover $h'$ on the upper opening of the lower retort, $e'$, is removed, the grates $i'$ in the lower outlet or discharge opening thereof being previously placed in position and the lower door, $j'$, closed. The cover or door $e^{11}$ on the bottom of the upper retort, $a'$, is then removed, and the grating $f'$ therein swung back, when the coke of the bituminous mineral is dropped into the lower retort, $e'$, after which the grating $f'$ and door $e^{11}$ of the upper retort are again closed and it is again charged with bituminous mineral. Steam is now let into the bottom of the lower retort, $e'$, through the openings E', by opening the valve $k'$ on the pipe $l'$, leading from the steam-main $m'$. This steam may be used alone or made to act as a steam-jet, and draw in with it a quantity of air, regulated by the slide $n'$, placed over the inlet C'; but in all cases the steam must be in excess, so that a portion may pass away undecomposed through the coke contained in the retort. The gaseous products, ammonia, and steam pass from the retort through the openings $o'$, and by the pipe $p'$, leading to the main B', and are either treated direct for the recovery of the ammonia by causing them to pass while hot through an arrangement, such as a Glover's tower, through which sulphuric acid is made to pass and absorb the ammonia, or the whole products may be condensed and the ammonia absorbed by the condensed steam in suitable scrubbers, from which the ammonia is recovered in the usual manner. So soon as the coke or residue of the bituminous mineral ceases to yield ammonia by treatment with steam the steam is shut off by closing the stop-valve $k'$, opening the door $j'$, removing the grating $i'$, and discharging the coke or residue. The grating and door are then replaced and a fresh charge of coke discharged into the lower retort, $e'$, from the upper retort, $a'$, as hereinbefore described. The steam is again turned on into the lower retort, $e'$, and a fresh charge of shale placed in the upper retort, $a'$, and the process as described is repeated continuously. This modification of practicing our invention is workable only with non-coking coal or minerals which do not run into a solid mass when heated.

Figs. 15, 16, 17, 18, and 19, represent, respectively, transverse section, longitudinal section, sectional plan, top view, and front elevation of another modification for carrying out our invention with coking-coals or other similar bituminous minerals, and this is designed more particularly with the object of illustrating the application of our invention to apparatus suitable for making illuminating and heating gases.

The retorts $a^{22}$ for effecting the destructive distillation of the coal are of the usual horizontal type employed for the manufacture of gas, and may be similarly connected by stand-pipes to a hydraulic main. In such case just such a temperature, and no more, is employed to effect the distillation as shall produce tars as free as possible from the paraffine series, but not sufficiently high to decompose the nitrogenous compounds contained in the coal and set the nitrogen free as a gas; but where a quantity of gas is desired, the arrangement as shown in these figures will be found most suitable, by which the products of the destructive distillation of the coal or bituminous matter in the horizontal retorts is subjected to a second and higher temperature in another series of retorts before passing to the hydraulic main; but whichever system is adopted the treatment of the coal or other bituminous mineral and of its coke for the recovery of the nitrogen it contains as ammonia is the same.

The arrangement, as shown, consists of five horizontal retorts, $a^{22}$, with five decomposing-chambers, $b^2$, for the treatment of the volatile products from the horizontal retorts, and underneath these are the ten vertical retorts $c^2$ for the treatment of the coke for the elimination of the ammonia, two of which retorts, as shown, have furnaces or combustion-chambers $d^2$ at the lower ends, where the residual coke is consumed in supplying the necessary heat for carrying out the process. The others are supplied with grate-bars or a door at the lower end, which can be hermetically sealed.

The temperatures of the different parts of the arrangement may be slightly modified to suit the different classes of the minerals to be treated; but in all cases the lower retorts, $c^{12}$, must be brought to a bright red heat, the decomposing-chamber $b^2$ slightly lower, and the horizontal retorts $a^{22}$ still a little lower. The necessary temperatures being brought up upon the various parts of the arrangement by means of fires kindled in the combustion-chamber $d^2$, the coal or other bituminous mineral to be distilled is charged into the retorts from both ends in the usual manner, and the doors closed. The products of distillation pass by the stand-pipes $e^2$ into the main $f^2$, each stand-pipe being provided with a valve, $g^2$, to prevent any back-flow of the gas. The volatile products are thence carried by the pipe $h^2$ into the passage $i^2$, communicating with the five decomposing-chambers $b^2$, through which they pass, and are collected again in the passage $j^2$, and are conveyed by the pipe $k^2$ to the hydraulic main $l^2$, to be passed to the condenser and treated in the usual manner.

The decomposing-chambers $b^2$ may be filled with lumps of coke, brick, or other solid matter; but it is preferred to keep them empty, the radiant heat from the walls being sufficient to effect the decomposition necessary. The carbon deposited in these chambers may be removed by the door $m^2$, placed on each end of the chamber $b^2$, either by mechanical rakes or by passing a current of steam through them. So soon as the volatile matters are distilled out of the coal or other substances the coke is raked out of the horizontal retorts $a^{22}$ at both ends, and transferred, by means of the chute $n^2$, into the retorts $c^{12}$. A fresh charge of coal or other substance is immediately introduced into the horizontal retorts $a^{22}$. At the same time the openings $o^2$ on the lower retorts are closed, and a current of steam turned onto the retorts by opening the taps $p^2$, leading from the main steam-pipe into the annular space $q^2$, surrounding the outlet-pipe $r^2$, Figs. 19 and 16, leading from the retort $c^2$ to the hydraulic main $s^2$. The steam, passing into the retort by the annular space $q^2$ by the pipe $t^2$, through the openings $u^2$, up through the incandescent coke contained in the retorts, is partly decomposed, supplying hydrogen to the nitrogen in the coke and effecting its elimination in the form of ammonia. At the same time there is produced a large volume of water-gas. The ammonia, water-gas, and undecomposed steam pass from the retorts by the ports $v^2$, thence by the pipe $r^2$ to the hydraulic main $s^2$, and, being at a very high temperature in their passage from the retorts by the pipe $r^2$, leading to the hydraulic main $s^2$, impart their heat, or a portion of it, to the steam on its way to the retorts through the annular space $q^2$ surrounding it. The fire-gas from the combustion-chamber may be prevented from entering the open bottoms of the two central retorts by returning a portion of the water-gas, after it has been treated for the recovery of the ammonia, back, as shown, by the pipe $w^2$, into the flue surrounding the lower end of the retorts. The water-gas, ammonia compounds, and steam are drawn off from the hydraulic main to the condensers and scrubbers for the recovery of the ammonia.

As it is found necessary, in order to obtain the nitrogen in the coke as ammonia, that there should be always an excess of steam passing through the coke, the water-gas always contains a large quantity of carbonic acid. Where the gas is to be used for heating alone, this is not a very serious objection; but where it is desired to carburet the gas and convert it into an illuminating-gas or to commingle a portion of it with the hydrocarbon gases produced from the coal in the horizontal retorts, we pass the gas, after the ammonia and condensed steam have been removed, through a retort charged with highly-heated carbon to convert the carbonic acid into carbonic oxide. This carbon may be heated by blowing air through it until it is incandescent, then shutting off the air, and passing the gas through or by the application of an exhaust to the retort containing the carbon. As the coke is burned away or consumed in the retorts $c^{12}$ in the atmosphere of steam and on the combustion-chambers $d^2$ by the air, the lower doors, $x^2$, are opened and the ashes from time to time removed and fresh charges transferred into them from the horizontal retorts, the process being carried on continuously; or the ammonia produced in this process may be employed to absorb and remove the carbonic-acid gas. This process may be profitably carried on in conjunction with the manufacture of carbonate of soda from common salt by the well-known carbonate-of-ammonia process.

Figs. 10 and 11 show in transverse section and elevation, partly in section, a bench of retorts. Instead of being provided with one exit-pipe placed in the multiple hopper and serving for four retorts, each retort is provided with two exit-pipes connected with two separate sets of mains.

In Figs. 10 and 11, $a\ a$ is the hopper supplying four retorts with shale; $a'\ a'$, the upper portion of the retort, made of iron; $a^2\ a^2$, the lower portion of the retort, made of fire-clay or built of bricks; $a^3\ a^3$, the iron continuation of retort into water-lute through trough $p$; S, steam-generator or superheater-chamber; $S^5$, main steam-pipe from generators to retorts; $S^{15}$, branch pipes from main steam-pipe; M M, mains for illuminating-gas; $e^3\ e^3$, exit-pipes from upper retorts to mains M M; $e^4\ e^4$, valves and stand-pipes on mains M M; $e\ e$, exit pipes or channels on lower retorts, molded or built on the side of retort; $e^{12}\ e^{12}$, iron exit-pipes connecting retorts with $e^2\ e^2$, stand-pipes, and valves on M' M', heating gas mains. $d\ d$ are ports connecting the upper and lower ovens. $d'\ d'$ are dampers.

In working these retorts the shale, coal, or like material is passed through continuously, or practically so, small quantities of the spent material being removed through the water-lute trough $p$ and its place supplied at the upper end of the retort by an addition of fresh material through the hopper $a$. The upper retort, $a'\ a'$, is kept at a moderate-red heat, just sufficient for the production of illuminating-gas and benzole tars. These products escape by the pipes $e^3$ to the mains M, from which they pass through the ordinary arrangement of condensers, scrubbers, exhausters, and purifiers.

The lower portion of the retort is kept at a bright-red heat sufficiently high to enable the fixed carbon of the coke to decompose a portion of the steam which is passed through the retort, making carbonic acid and hydrogen. These gases, together with the ammonia from the coke, pass off by the exit $e$ to the mains M' M', and thence through condensers, exhausters, scrubbers, and purifiers.

Some care is requisite in the preliminary adjustment of the relative capacities of the two sets of exhausters which draw off the illuminating-gas from the upper and the heating-gas from the lower retort; but if the proportion which these two qualities of gas will bear to each other when any particular class of coal, shale, or other material is being distilled at certain definite heats is once ascertained, then the respective exhausters can be set so as each to draw and deliver definite proportions of the two classes of gas.

Figs. 20 and 22 show sectional elevations at right angles to each other of blast-furnace.

Figs. 23 and 21, respectively, show general plan and horizontal section of the same, illustrating the carrying out of this invention. The retorts $a^3$, for effecting the preliminary destructive distillation of the coal or other bituminous substance, are rectangular in form, supported on the top of the furnace by the arches $b^3$, thrown from side to side of the furnace, and are surrounded by the walls B, which form an oven or chamber, in which they are made brightly-red hot by the combustion of a portion of the blast-furnace gases either after they have been treated for the recovery of the ammonia they contain or taken direct from the furnace, as is shown, by the ports $c^3$, leading from the main gas off-take flue $d^3$, the combustion of the gas being completed by the admission of air regulated by a sliding plate or damper at $e^{31}$, Fig. 20. In describing the working of this arrangement it is supposed that the furnace has been got into full blast in the usual way, the coal or mineral having been charged through the retorts $a^3$, and that the body of the furnace $f^3$ and the lower part of the retort $a^3$ are filled with the coke of the coal, together with the iron-stone or other mineral which has been charged through the hopper or valve $g^3$ into the retort, and that the upper parts of the retorts are freshly charged with green coal and mineral. The blast-furnace gases pass by the side openings and ports, $h^3$, into the gas-flue $d^3$, thence by the tube $i^3$ into the descending tube $j^3$, through the center of the wall in the chamber or boiler $k^3$. These gases, leaving the furnace from among the highly-heated coke dropping from the retort $a^3$, have necessarily a very high temperature. This heat is imparted to the water in the steam-boiler, raises steam to be used alone or assisted, if necessary, by steam from other sources, as hereinafter described, in the elimination of the nitrogen from the coal and the other mineral used in the furnace, the steam being conveyed by the pipe $l^3$ into the bottom of the retorts $a^3$ through the port-holes $m^3$, the quantities being regulated by the valves $n^3$. This steam is partially decomposed as it passes up through and among the red-hot coke of the coal and other mineral supplying the hydrogen necessary to combine with the nitrogen and form ammonia. The tar, gas, steam, and ammonia are drawn off from the retorts by the pipes $o^3$, leading to the main $p^3$, and conveyed to the condensers and scrubbers, any convenient form of exhauster being employed for that purpose.

To insure that no furnace-gases shall pass up into the open end of the retorts $a^3$, the uncondensable gases, after the condensed volatile tars and ammonia have been separated, are returned back by the pipe $g^3$ into the lower end of the furnace by the ports $r^3$, the quantities being regulated to the different retorts by the valves $s^3$. A part of this gas, equivalent to the excess of the exhaust, passes up through the retorts and accompanies the steam, ammonia, and other products a second time through the condensers; but a portion equal to the quantity being produced from the coal in the retorts passes down into the furnaces, pushing back and accompanying the blast-furnace gases.

Figure 16:
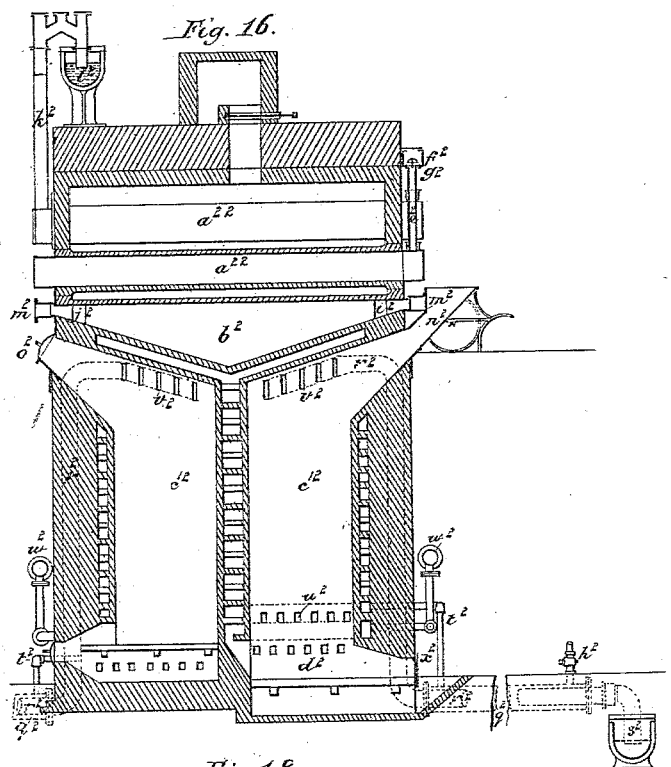
Figure 17:
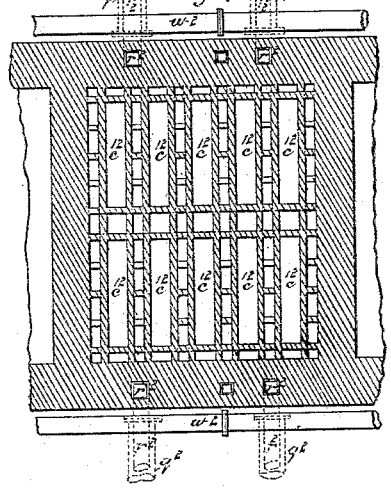
Figure 18:
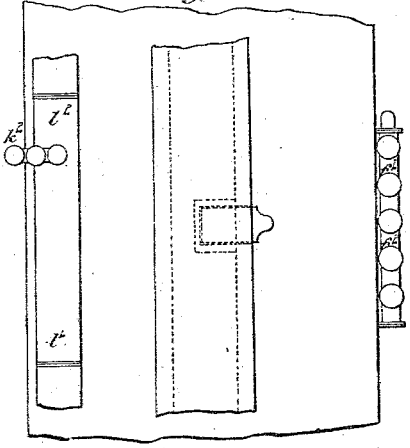

With the great bulk of coals the retort arrangements now described will be found sufficient to eliminate the greater part of the nitrogen which they contain as ammonia; but with coals which contain a large quantity of nitrogen, or which do not part with it freely by the action of steam, or where no preliminary retort arrangement and the ordinary close-top furnace are employed, it may be found profitable to admit steam into the body of the furnace, as shown, by the flue $t^3$ and ports $u^3$, Fig. 16. This steam no doubt carries away, in the form of carbonic acid, part of the carbon which would have been employed in reducing the iron-stone to metallic iron; but the quantity of ammonia evolved will more than repay the loss. The blast-furnace gases pass by the tube $j^3$ into the scrubbing arrangements $C^3$, consisting of a series of tubular plates, $v^3$, having caps or covers $w^3$, of thin sheet metal, attached to a central wire or rod passing through the center of the tube $x^3$, enlarged views of which are shown in Figs. 25 and 26. These central wires, being loose in the tubular orifices $x^3$, are kept moving about as the caps are lifted up and down by the passing gas, and the tubular orifices $x^3$ are thus prevented from closing by matter collecting in them. Through this arrangement of apparatus water is showered and kept at such a temperature as will prevent the absorption of ammonia. This hot-water washing frees the gases from suspended dust; or, in the case of furnaces in which the preliminary distillation is not employed, but the tars accompany the gases, which flow away by the pipes $y^3$ to suitable receptacles, this washing will remove all tars and leave the gases fit to pass into arrangements of apparatus—such as are known as "Glover's towers"—where the ammonia which they contain can be removed by sulphuric acid, and the solution of sulphate of ammonia so formed drawn off and converted into sulphate, or where the preliminary distillation of the coal is not effected in retorts placed on the top of the furnace, and when the tars accompany the gases they may be removed by subjecting them to a process of decomposition in an atmosphere of steam in the arrangement of apparatus shown in Figs. 27 and 28. This arrangement consists of an upright malleable-iron cylinder, $a^4$, lined with walls of brick $b^4$, and having an arch, $c^4$, thrown over its lower end, perforated with openings $d^4$. On these openings are placed tubes $e^4$, made of fire-clay or other fire-resisting material. These tubes $e^4$ are formed in lengths, and at their junctions $f^4$ rest against and support each other, at the same time leaving a space, $g^4$, for the passage of the fire-gases. Any convenient number of these tubes may be placed over each other. They terminate in a closed chamber, $h^4$. These tubes are heated to a bright-red heat by a portion of the gases, after the ammonia has been removed, being forced back by the pipe $i^4$ into the flue $j^4$, and there consumed by meeting a current of hot air supplied by the pipe $k^4$ to the flue $l^4$. The hot products of combustion from the combined air and gas pass around the tubes and upward from tier to tier and escape by the chimney. The gases containing the tars enter by the pipe $m^4$ from the furnace, and are mixed with steam largely in excess of what is necessary to decompose the tars. The mixed gas, tar, and steam descend through the tiers of tubes, and gradually become more and more decomposed until, by the time they reach the chamber $o^4$ at the bottom of the arrangement, they are completely changed, the nitrogen which was present in the tars, or the greater part of it, being converted into ammonia, and the carbon into carbonic acid. As the gases leaving this arrangement are at a high temperature, they may be used, as shown, to raise the steam, or a part of it, to effect the decomposition, the gases passing through the tubes $p^4$ of the boiler $q^4$, and the steam passing by the pipe $r^4$ to where the gases and tars enter the arrangement, which is here shown as acting as a steam-jet to urge the gases forward.

As any great difference of pressure between the inside of the tubes and the chamber in which they are inclosed would lead to the leakage of the gases, the device on the top of the apparatus may be used to keep both pressures as nearly as possible alike and prevent leakage. This device consists of a gas-holder, $s^4$, actuated by the gases passing from the top of the inlet for furnace-gases. This gas-holder $s^4$ has the same superficial area as the valve $t^4$ on the top of the chimney $u^4$, to which it is attached by the rod $v^4$ and lever $w^4$. It is evident that any pressure coming upon the gas-holder $s^4$ will tend to close the valve $t^4$ on the top of the chimney $u^4$, and, vice versa, any relief of pressure on the holder would allow it to fall and proportionally open the valve.

Instead of employing the tubular arrangement just described for the decomposition of the tars, an arrangement may be used the same as is employed to heat the blast for smelting purposes, known as the Siemens, Cowper, or Whitwell heater, the gases containing the tar, together with the necessary steam, taking the place of the air to be heated; but, by whichever process the tars present in the gases are decomposed, they are afterward washed with hot water, as previously described, and the ammonia absorbed with acid in a Glover's tower or other similar arrangement. The tar from other minerals may be similarly treated for the recovery of the nitrogen which they contain as ammonia.

This invention may be also applied to the elimination of the nitrogen, or part of it, as ammonia from coal subjected to the process of coking in closed or nearly-closed vessels, provided that the coking process is effected at a temperature sufficiently low to prevent the decomposition of the nitrogen compounds and set the nitrogen free as a gas, provision being made to consume a portion of the coke in an atmosphere of steam. A large yield of ammonia may thus be obtained.

Fig. 24 shows the process as applied to what is known as the "Appolt coke-oven," where, instead of allowing the products of distillation to escape into the surrounding flue-space $a^{15}$ through the ports $b^5$, as has hitherto been the case, there is a pipe, $c^5$, taken from the top of each chamber $d^5$ to a main, $e^5$, which communicates with suitable condensing and scrubbing arrangements for the separation of the tar and ammonia, the non-condensable gas being returned and used as fuel to effect the distillation, assisted by gas produced either in a separate converter from the breeze or small coke, or by having a retort or furnace placed in the bench of coking-chambers, as described in reference to Figs. 15 to 19 of the accompanying drawings, steam for the elimination of the nitrogen, or a part of it, being let into the retort from the main steam-pipe $f^5$, through the ports $b^5$, passing up through the coke and away to the condensers by the pipe $c^5$.

The calcining of iron-stone and limestone and the recovery of the ammonia therefrom, together with the ammonia from the coal used to effect the calcination, is effected by means of arrangements of retorts placed on the top of the calcining-kiln similar to those placed on the top of blast-furnaces, as shown and herein described in reference to Figs. 20 and 23 of the accompanying drawings, only, instead of the lower portion being as in the blast-furnace, it is fired, as is usual in kilns for the calcining of limestone and iron-stone, and all the products from the lower part of the furnace are taken up and around the retorts to heat them.

It is to be understood that although we have described in the apparatus for conducting our process of recovering ammonia the use of a steam-pipe for admitting steam from an external source to the retorts, yet that when we treat a highly-hygrometric substance—such as peat—the steam may be generated by the heat of the retort or by the heat of a supplementary vessel acting upon the water in the said substances, such steam passing downward through the hot coke in the lower part of the retort, the outlet for the products of the distillation being situated in that position.

The retort represented at Fig. 12 is constructed similar to ordinary double-mouthed horizontal retorts, and is provided with two independent hydraulic mains, $a^{16}\ b^6$, which are respectively for the illuminating and heating gases. After the ash or coke of the previous charge has been removed and the valve $c^6$ closed and the valve $d^6$ opened, the retort $e^6$ is charged and closed in the usual manner, and the illuminating-gases pass up through the pipe $f^6$ and valve $d^6$ into the hydraulic main $a^{16}$, from which it may be taken to the condensers or any other required apparatus. After all the illuminating-gas has been liberated from the charge within the retort $e^6$ the valve $d^5$ is closed and the valve $c^6$ opened. The steam-valve $g^6$ in the pipe $h^6$, connected with the steam-main $i^6$ and inlet $j^6$, is then opened, and the steam, in passing through the coke in the retort, is decomposed, and the liberated hydrogen combines with the nitrogen of the coke, which forms the ammonia, and the oxygen of the steam combines with the carbon of the coke, which forms carbonic acid. These gases by an excess of steam are then driven up the pipe $k^6$ and through the valve $c^6$ into the hydraulic main $b^6$, from which they may be taken to the condensers or scrubbers or other apparatus for recovering the ammonia. After these gases have been all eliminated the valve $c^6$ is closed and the ash or coke from the retort $e^6$ is then removed and a fresh charge introduced, when the process is repeated.

It is to be understood that when air is used with steam for the purpose of burning the carbon and eliminating the nitrogen care must be taken that the air admitted is not sufficient of itself to burn the whole of the carbon.

We are aware that furnace-gases with water vapor have been passed through a chamber containing coke at a red heat, whereby the water vapor has been decomposed and the hydrogen permitted to combine with the nitrogen of the gases, and we do not claim such process.

We claim—

1. The herein-described process of treating coal, shale, and other substances to obtain ammonia and ammoniacal compounds, consisting in heating the material to a temperature sufficient to separate its volatile matter, conducting the latter from the retort to a suitable condenser, passing the residue in the retort to a combustion-chamber supplied with steam, and conducting away and condensing the ammoniacal vapors formed in the combustion-chamber, substantially as described.

2. The herein-described process of treating coal, shale, and other substances to obtain ammonia and ammoniacal compounds, consisting in heating the material in a retort having a combustion-chamber to a temperature sufficient to separate its volatile matter, conducting the latter from the retort, passing it through a condenser, and returning the non-condensable gases to the combustion-chamber of the retort to aid combustion and prevent the carrying off of air or fire-gases, substantially as described.

3. The herein-described process of treating coal, shale, and other substances to obtain ammonia and ammoniacal compounds, consisting in heating the material to a temperature sufficient to separate its volatile matter, exhausting the latter from the retort, passing it through a condenser, and returning the non-condensable gases to the retort to aid the combustion and prevent the carrying off of air or fire-gases by supplying any excess of the exhaust, substantially as described.

4. The combination, with a retort having a combustion-chamber at one end, of a condenser, a gas-conduit between the other end of the retort and the condenser, an exhaust for drawing the gas from the retort through said conduits, and conduits for returning the non-condensable gases to the retort at the end having the combustion-chamber, substantially as set forth.

5. The combination of a retort, as $B^2$, with one or more other retorts, as $a'\ a^2$, the former having a combustion-chamber at one end, a gas-conduit leading from the other end, and heat-passages communicating with the combustion-chamber surrounding the first retort and leading to and surrounding said second retort, and the latter having at its less highly-heated end a gas-conduit, substantially as set forth.

6. The combination of a retort, as $B^2$, with one or more other retorts, as $a'\ a^2$, the former having a combustion-chamber at one end, a gas-conduit leading from the other end, and heat-passages communicating with the combustion-chamber surrounding the first retort and leading to and surrounding said second retort, and the latter having at its less highly-heated end a gas-conduit, and conduits, as $c^3\ c\ c'$, between its more highly-heated end and the combustion-chamber of the first retort for conducting combustible gases from the second retort to the first, substantially as set forth.

7. The combination of a retort, as $B^2$, with a plurality of other retorts, as $a'\ a^2$, the former having a combustion-chamber at one end, a gas-conduit leading from the other end, and heat-passages communicating with the combustion-chamber surrounding the first retort and leading to and adapted to heat the said group of retorts, and the latter having at their less highly-heated ends a common redistillation-chamber, where the less volatile of the gases from the lower part of the retorts may be collected and detained while the more volatile are passing off, and a gas-conduit from the redistillation-chamber, substantially as set forth.

8. The combination of a retort, as $B^2$, with a plurality of other retorts, as $a'\ a^2$, the former having a combustion-chamber at one end, a gas-conduit leading from the other end, and heat-passages communicating with the combustion-chamber surrounding the first retort and leading to and adapted to heat the said group of retorts, and the latter having at their less highly-heated ends a common redistillation-chamber, where the less volatile of the gases from the lower part of the retorts may be collected and detained while the more volatile are passing off, a gas-conduit from the redistillation-chamber, and steam-conduits for supplying the last-mentioned retorts, substantially as set forth.

9. The combination of the two-part retorts $a^2\ a'$ with heat-passages arranged to highly heat the part $a^2$ and to bring all portions of the part $a'$ to a substantially uniform but lower degree of heat, and the common redistillation-chamber $a$ for receiving the cold material, substantially as set forth.

In testimony whereof we have signed our names to this specification in the presence of two subscribing witnesses.

WM. YOUNG.
GEORGE THOMAS BEILBY.

Witnesses:
ROBERT ADAM GUNN,
WILLIAM SMITH,
*Both of 115 St. Vincent Street, Glasgow.*